US012380123B2

(12) United States Patent
Bhattacharjee et al.

(10) Patent No.: US 12,380,123 B2
(45) Date of Patent: Aug. 5, 2025

(54) DATA PIPELINE RECONFIGURATION

(71) Applicant: HONEYWELL INTERNATIONAL INC., Charlotte, NC (US)

(72) Inventors: Arnab Bhattacharjee, Bangalore (IN); Ashwath Kakde, Bangalore (IN); Nikhil Bansal, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/530,226

(22) Filed: Dec. 6, 2023

(65) Prior Publication Data
US 2025/0190442 A1 Jun. 12, 2025

(51) Int. Cl.
*G06F 16/00* (2019.01)
*G06F 16/25* (2019.01)
(52) U.S. Cl.
CPC .................. *G06F 16/252* (2019.01)
(58) Field of Classification Search
CPC .......... G06F 40/00; G06F 30/00; G06F 21/00; G06F 18/00; G06F 17/00; G06F 16/00; G06F 15/00; G06F 13/00; G06F 12/00; G06F 11/00; G06F 9/00; G06F 8/00; G06F 7/00; G06F 1/00; G06F 3/00; G06F 5/00; G06F 21/44; G06F 21/74; G06F 3/064; G06F 11/30; G06F 13/16; G06F 16/29; G06F 16/54; H04L 65/1069; H04L 67/1097

See application file for complete search history.

(56) References Cited

U.S. PATENT DOCUMENTS

| | | | |
|---|---|---|---|
| 2014/0032525 A1* | 1/2014 | Merriman | G06F 16/24556 707/713 |
| 2018/0300381 A1* | 10/2018 | Horowitz | G06F 16/258 |
| 2021/0144517 A1* | 5/2021 | Guim Bernat | H04L 9/3247 |

* cited by examiner

*Primary Examiner* — Shyue Jiunn Hwa

(57) ABSTRACT

Techniques for reconfiguring a data pipeline in a computing environment are described. In operation, a request for modifying a transformation standard of a first data pipeline is received, where the first data pipeline exists between a data ingestion system and a first database instance of a computing environment, and the first data pipeline transforms the data received from the data ingestion system in accordance with the transformation standard. A second data pipeline is then established in parallel to the first data pipeline, the second data pipeline is established between the data ingestion system and the first database instance in response to the request for modifying the transformation standard, and the second data pipeline processes the data received from the data ingestion system in accordance with a modified transformation standard. The second data pipeline is then initiated to transform the data received from the data ingestion system. The first data pipeline is then disconnected from the data ingestion system and the first database instance.

16 Claims, 10 Drawing Sheets

DATA PIPELINE RECONFIGURATION

BACKGROUND

An industrial facility includes different equipment for performing various operations. To monitor the operations of the equipment, data related to the different equipment is collected and analyzed. In operation, the data related to the different equipment is collected and transformed in accordance with different transformation standards, where the transformation standards may be indicative of different policies for conversion of the data into various formats. Subsequently, various insights corresponding to the different equipment may be derived based on the transformed data.

Similarly, data related to equipment present at multiple industrial facilities may also be collected and then transformed in accordance with different transformation standards, where the data being collected from each of the multiple industrial facilities may be processed in accordance with an associated transformation standard.

DETAILED DESCRIPTION

Figure 1:
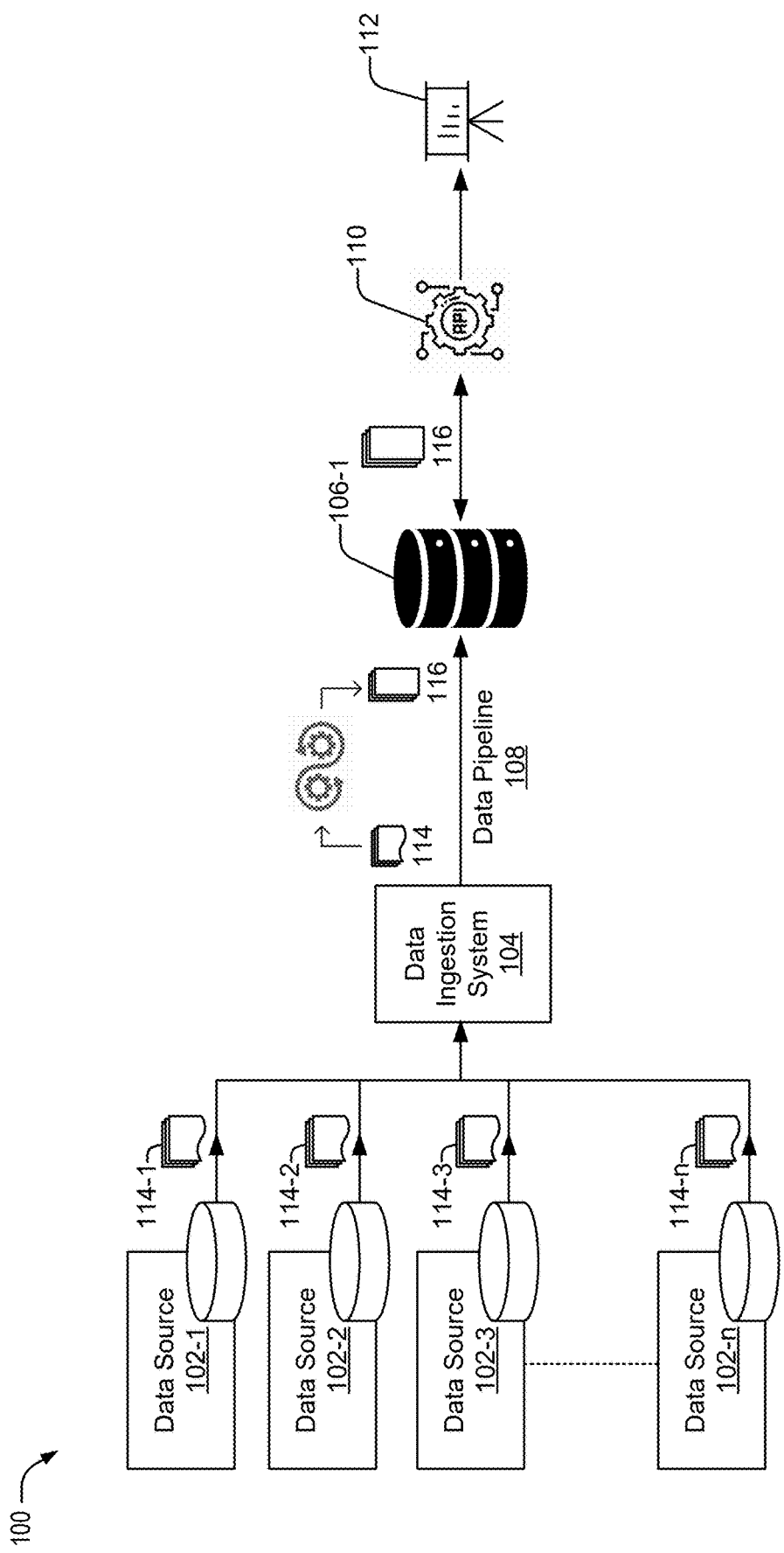
FIG. 1 illustrates a computing environment implementing a data pipeline, in accordance with an example of the present subject matter.

Collection and transformation of data received from the multiple industrial facilities is usually performed by a computing infrastructure. To ensure efficient utilization of such computing infrastructure, the computing infrastructure is usually shared amongst multiple industrial facilities to process the data collected from such multiple industrial facilities. For instance, there may be a situation where the computing infrastructure may be utilized for transformation of the data to make the data suitable for derivation of various Key Performance Indicators (KPIs) related to equipment present at the multiple industrial facilities. In such a situation, the computing infrastructure may be shared among multiple tenants for transformation of the data in accordance with different transformation standards, where the multiple tenants correspond to the multiple industrial facilities.

A typical computing environment for facilitating transformation of such data for multiple tenants may include a data ingestion system that collects the data from the multiple industrial facilities, a data pipeline communicatively coupled to the data ingestion system for performing transformation of the data, a database communicatively coupled to the data pipeline for storing the transformed data, and an Application Programming Interface (API) coupled to the database for collecting and delivering the transformed data to the multiple tenants.

Typically, the data ingestion system collects the data from the multiple industrial facilities and transmits the same to be stored in the database via the data pipeline. While the data is being transmitted to the database, the data pipeline transforms the data to facilitate utilization of such data for derivation of insights. The transformation of the data may be performed in accordance with a tenant specific transformation standard. The data pipeline may then ingest the transformed data into the database, where the transformed data may be stored in different data structures. Subsequently, the API may receive a request for collection of transformed data from a tenant from the multiple tenants. Upon reception of such a request, the API may query the database and deliver the transformed data corresponding to the first tenant.

However, there are instances when a tenant, for example, a first tenant from the multiple tenants, wishes to modify a transformation standard being utilized for transformation of the data. In such a situation, the data pipeline may have to be reconfigured in accordance with a modified transformation standard. Known methods of reconfiguring the data pipeline involve taking the data pipeline out of operation, reconfiguring the data pipeline with the modified transformation standard, and redeploying the data pipeline from the instant when the data pipeline was taken down. Since the data pipeline is shared amongst multiple tenants, taking the pipeline out of operation puts the transformation of data on hold for tenants other than the first tenant as well, even when the modification of the transformation standard is not requested by the other tenants. In addition, there are situations where performing the data transformation includes addition of new parameters to the data. In such a situation, in addition to taking down the data pipeline, a schema of the database table may have to be updated to allow storage of the new parameters associated with the data. As a result, downtime linked to the flow of data to the other tenants is further prolonged.

According to examples of the present subject matter, techniques for reconfiguration of a data pipeline in a computing environment are described.

In an example implementation, a request for modifying a transformation standard of a first data pipeline may be received, where the first data pipeline exists between a data ingestion system and a first database instance of a computing environment. The first data pipeline may transform data received from the data ingestion system in accordance with the transformation standard. Thereafter, a second data pipeline may be established in parallel to the first data pipeline, where the second data pipeline is established between the data ingestion system and the first database instance in response to the request for modifying the transformation standard. The second data pipeline may transform the data received from the data ingestion system in accordance with a modified transformation standard. Thereafter, the second data pipeline may be initiated to transform the data received from the data ingestion system. Subsequently, the first data pipeline may be disconnected from the data ingestion system and the first database instance.

In an example, until the first data pipeline is disconnected from the data ingestion system and the first database instance, the data transformed by each of the first data pipeline and the second data pipeline may be transmitted to the first database instance. In the example, an Application Programming Interface (API) may be configured in communication with the first database instance, where the API may fetch the data transformed by each of the first data pipeline and the second data pipeline upon reception of a request for providing the transformed data. Further, in the example, the API may be modified to fetch the data transformed by the second data pipeline upon reception of the request for providing the transformed data.

Establishing the second data pipeline with the modified transformation standard in parallel to the first data pipeline and initiating transformation of the data at the second data pipeline before disconnecting the first data pipeline ensures that the transformation standard being utilized for processing of the data is reconfigured in real-time without any downtime in data transformation being performed in the computing environment.

The above techniques are further described with reference to FIGS. 1 to 9. It would be noted that the description and the figures merely illustrate the principles of the present subject matter along with examples described herein and would not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 illustrates a computing environment 100 implementing a data pipeline, in accordance with an example of the present subject matter. The computing environment 100 may include a plurality of data sources 102-1, 102-2, 102-3, . . . , 102-*n*. The plurality of data sources 102-1, 102-2, 102-3, . . . , 102-*n* may include, but is not limited to, storage drives, mobile applications, websites, web applications, microservices, and Internet of Things (IoT) devices. For the sake of reference, the plurality of data sources 102-1, 102-2, 102-3, . . . , 102-*n* have been referred to as the data sources 102, hereinafter.

The computing environment 100 may further include a data ingestion system 104 communicatively coupled to the data sources 102. The data ingestion system 104 may be communicatively coupled to the data sources 102 through a network (not shown). The data sources 102 may be communicatively coupled to the data ingestion system 104 either through a direct communication link, or through multiple communication links of the network. The network may be a wireless or a wired network, or a combination thereof. The network can be a collection of individual networks, interconnected with each other and functioning as a single large network. Examples of such individual networks include, but are not limited to, Global System for Mobile communication (GSM) network, Universal Mobile Telecommunications System (UMTS) network, Long Term Evolution (LTE) network, 5$^{th}$ Generation New Radio network, personal communications service (PCS) network, Time-division multiple access (TDMA) network, Code-Division Multiple Access (CDMA) network, next-generation network (NGN), public switched telephone network (PSTN), and Integrated Services Digital Network (ISDN). Depending on the terminology, the communication network includes various network entities, such as gateways and routers, however, such details have been omitted to maintain the brevity of the description.

In an example, the data ingestion system 104 may receive the data from the data sources 102. The data ingestion system 104 may receive the data from the data sources 102 based on various data ingestion mechanisms, such as batch processing, micro-batch processing, and stream processing.

The computing environment 100 may further include a first database instance 106-1 communicatively coupled to the data ingestion system 104. The first database instance 106-1 may be coupled to the data ingestion system 104 via a first data pipeline 108. In an example, the first data pipeline 108 may be configured to transform the data received from the data ingestion system 104 and deliver the transformed data to the first database instance 106-1. In the example, the first data pipeline 108 may be configured to transform the data in accordance with various transformation standards, where the various transformation standards are indicative of different policies for conversion of the data into various formats.

The computing environment 100 may further include a first Application Programming Interface (API) 110-1 coupled to the database instance 106. In an example, the first API 110-1 may query the first database instance 106-1 for retrieving the transformed data. The first API 110-1 may subsequently deliver the transformed data to a tenant, such as tenant 112, for consumption.

In operation, the data ingestion system 104 may receive the data, such as data 114-1, 114-2, 114-3, . . . , 114-*n*, from the data sources 102. In an example, the data ingestion system 104 may receive the data 114-1, 114-2, 114-3, . . . , 114-*n* in a raw format, such that, the data 114-1, 114-2, 114-3, . . . , 114-*n* may not be suitable for consumption by the tenant 112. For the ease of reference, the data 114-1, 114-2, 114-3, . . . , 114-*n*, has been referred to as the data 114, hereinafter.

As already explained, the data ingestion system 104 may receive the data 114 from the data sources 102 based on various data ingestion mechanisms, such as batch processing, micro-batch processing, and stream processing. The data ingestion system 104 may then forward the data 114 to the first database instance 106-1. In an example, the data ingestion system may forward the data 114 to the first database instance 106-1 at various instances that may be determined in accordance with the data ingestion mechanism utilized for receiving the data 114. For example, when batch processing is utilized for receiving the data 114 at the data ingestion system 104, the data ingestion system 104 may forward the data 114 to the first database instance 106-1 in batches and based on a schedule. On the other hand, when stream processing is utilized for receiving the data 114 at the data ingestion system 104, the data ingestion system 104 may forward the data 114 to the first database instance 106-1 instantly upon reception of the data 114.

In an example, when the data 114 is being transferred from the data ingestion system 104 to the first database instance 106-1, the first data pipeline 108 may transform the data 114 in accordance with a transformation standard before delivery to the first database instance 106-1. In an example, the transformation standard may be indicative of a first set of policies for transformation of the data 114 into a format corresponding to a tenant, such as the tenant 112. Accordingly, the data 114, upon transformation by the first data pipeline 108, may be transformed into a format that is suitable for analysis by the tenant 112.

The first API 110-1 may subsequently retrieve the transformed data 116 from the first database instance 106-1. The first API 110-1 may retrieve the transformed data 116 from the first database instance 106-1 at various instances. For instance, in an example, the first API 110-1 may retrieve the transformed data 116 from the first database instance 106-1 upon receiving a request for the transformed data 116 from the tenant 112. In another example, the first API 110-1 may retrieve the transformed data 116 from the first database instance 106-1 in accordance with a schedule for delivery of the transformed data 116 to the tenant 112. The first API 110-1 may accordingly deliver the transformed data 116 to the tenant 112. There may be a situation where the tenant 112 may wish that a transformation standard being utilized for transformation of the data 114 be modified. In such a situation, the tenant 112 may transmit a request for modification of the transformation standard. The manner in which the transformation standard being utilized by the first data pipeline 108 is modified is described with reference to the forthcoming figures.

Figure 2:
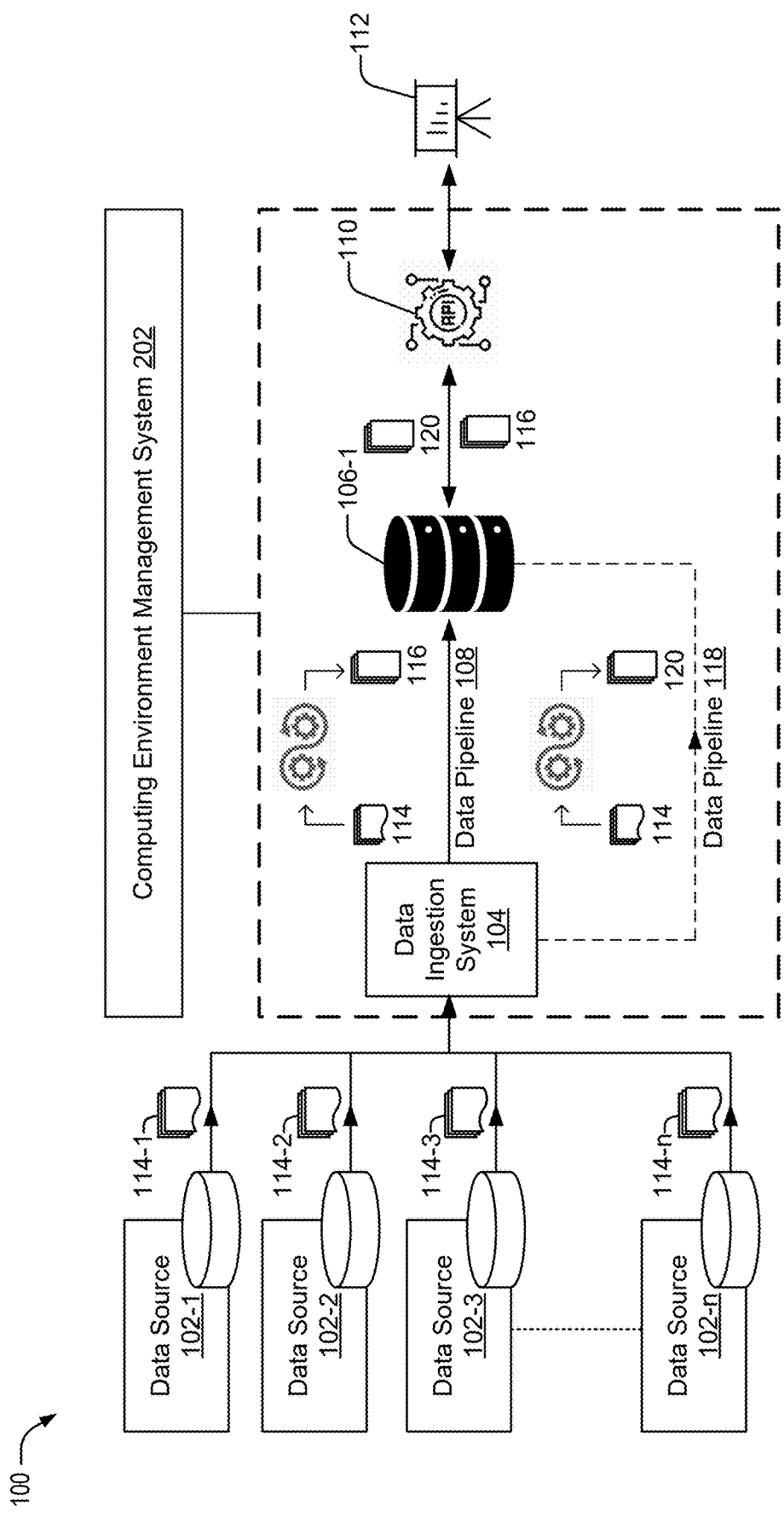
FIG. 2 illustrates the computing environment implementing the data pipeline, in accordance with another example of the present subject matter.

FIG. 2 illustrates the computing environment 100 implementing the data pipeline for transforming the data 114, in accordance with another example of the present subject matter. As already described, the computing environment 100 may include the data sources 102, the data ingestion system 104 coupled to the data sources 102, the first database instance 106-1 coupled to the data ingestion system 104, the first API 110-1 coupled to the database instance 106, and the tenant 112 coupled to the first API 110.

The computing environment 100 may further include a Computing Environment Management System (CEMS) 202. The CEMS 202 may either be a standalone computer or a combination of multiple computing devices operating together in a distributed computing environment. In an example, the CEMS 202, among other functions, may facilitate configuration and reconfiguration of various devices, such as the data ingestion system 104, the first database instance 106-1, the first data pipeline 108, and the first API 110, included in the computing environment 100.

The CEMS 202 may be communicatively coupled to each of the data ingestion system 104, the first database instance 106-1, the first data pipeline 108, and the first API 110, through a network (not shown). The CEMS 202 may be communicatively coupled to each of the data ingestion system 104, the first database instance 106-1, the first data pipeline 108, and the first API 110, either through a direct communication link, or through multiple communication links of the network. The network may be a wireless or a wired network, or a combination thereof. The network can be a collection of individual networks, interconnected with each other and functioning as a single large network. Examples of such individual networks include, but are not limited to, Global System for Mobile communication (GSM) network, Universal Mobile Telecommunications System (UMTS) network, Long Term Evolution (LTE) network, $5^{th}$ Generation New Radio network, personal communications service (PCS) network, Time-division multiple access (TDMA) network, Code-Division Multiple Access (CDMA) network, next-generation network (NGN), public switched telephone network (PSTN), and Integrated Services Digital Network (ISDN). Depending on the terminology, the communication network includes various network entities, such as gateways and routers, however, such details have been omitted to maintain the brevity of the description.

In an example, the CEMS 202 may receive a request for the modification of the transformation standard being utilized by the first data pipeline 108 for transformation of data received from the data ingestion system 104. In the example, the request may be received from the tenant 112.

In response to the request, the CEMS 202 may establish a second data pipeline 118 between the data ingestion system 104 and the first database instance 106-1, for transformation of the data 114 in accordance with a modified transformation standard. The CEMS 202 may establish the second data pipeline 118 in parallel to the first data pipeline 108, without disconnecting the first data pipeline 108. The CEMS 202 may subsequently initiate the second data pipeline 118 to transform the data received from the data ingestion system 104. Once the second data pipeline 118 is initiated, the second data pipeline 118 may begin transformation of the data 114 received from the data ingestion system 104. Subsequently, the second data pipeline 118 may forward the transformed data 120 to the database instance 106.

The CEMS 202 may also modify the first API 110-1 to enable retrieval of at least one of the transformed data 116 and the transformed data 120 from the database instance 106. In an example, the CEMS 202 may modify the first API 110-1 to enable retrieval of the transformed data 116 and the transformed data 120 from the database instance 106. In another example, the CEMS 202 may modify the first API 110-1 to enable retrieval of the transformed data 120 from the first database instance 106-1 and skip the retrieval of the transformed data 116.

Once the second data pipeline 118 has been initialized, the first data pipeline 108 and the second data pipeline 118 may simultaneously transform data 114 to generate the transformed data 116 and the transformed data 120, respectively. The first data pipeline 108 and the second data pipeline 118 may subsequently forward the transformed data 116 and the transformed data 120 to the database instance 106. The first API 110-1 may then retrieve at least one of the transformed data 116 and the transformed data 120 from the first database instance 106-1.

The first API 110-1 may retrieve at least one of the transformed data 116 and the transformed data 120 from the first database instance 106-1 at various instances. For instance, in an example, the first API 110-1 may retrieve at least one of the transformed data 116 and the transformed data 120 from the first database instance 106-1 upon receiving a request for delivery of the transformed data from the tenant 112. In another example, the first API 110-1 may retrieve at least one of the transformed data 116 and the transformed data 120 from the first database instance 106-1 in accordance with a schedule for delivery of the transformed data to the tenant 112.

In an example, once the second data pipeline 118 has been initialized, the CEMS 202 may disconnect the first data pipeline 108 from the data ingestion system 104 and the first database instance 106-1. Upon disconnection of the first data pipeline 108, the data 114 received from the data ingestion system 104 may be transformed at the second data pipeline 118 in accordance with the modified transformation standard before delivery to the first database instance 106-1.

Establishing the second data pipeline 118 with the modified transformation standard in parallel to the first data pipeline 108 and initiating transformation of the data at the second data pipeline 118 before disconnecting the first data pipeline 108 ensures that the transformation standard being utilized for processing of the data is reconfigured in real-time without any downtime in data transformation being performed in the computing environment.

It would be noted that while the computing environment 100 has been described to include the tenant 112, the computing environment 100 may include a plurality of tenants in addition to the tenant 112. Accordingly, the first data pipeline 108 is configured to transform the data 114 in accordance with a plurality of transformation standards corresponding to the plurality of tenants. Further, in such a situation, the modification of the transformation standard corresponding to a tenant, such as the tenant 112, may involve modification of the transformation standard corresponding to the tenant 112 while keeping the transformation standards corresponding to the plurality of tenants unchanged.

Figure 3:
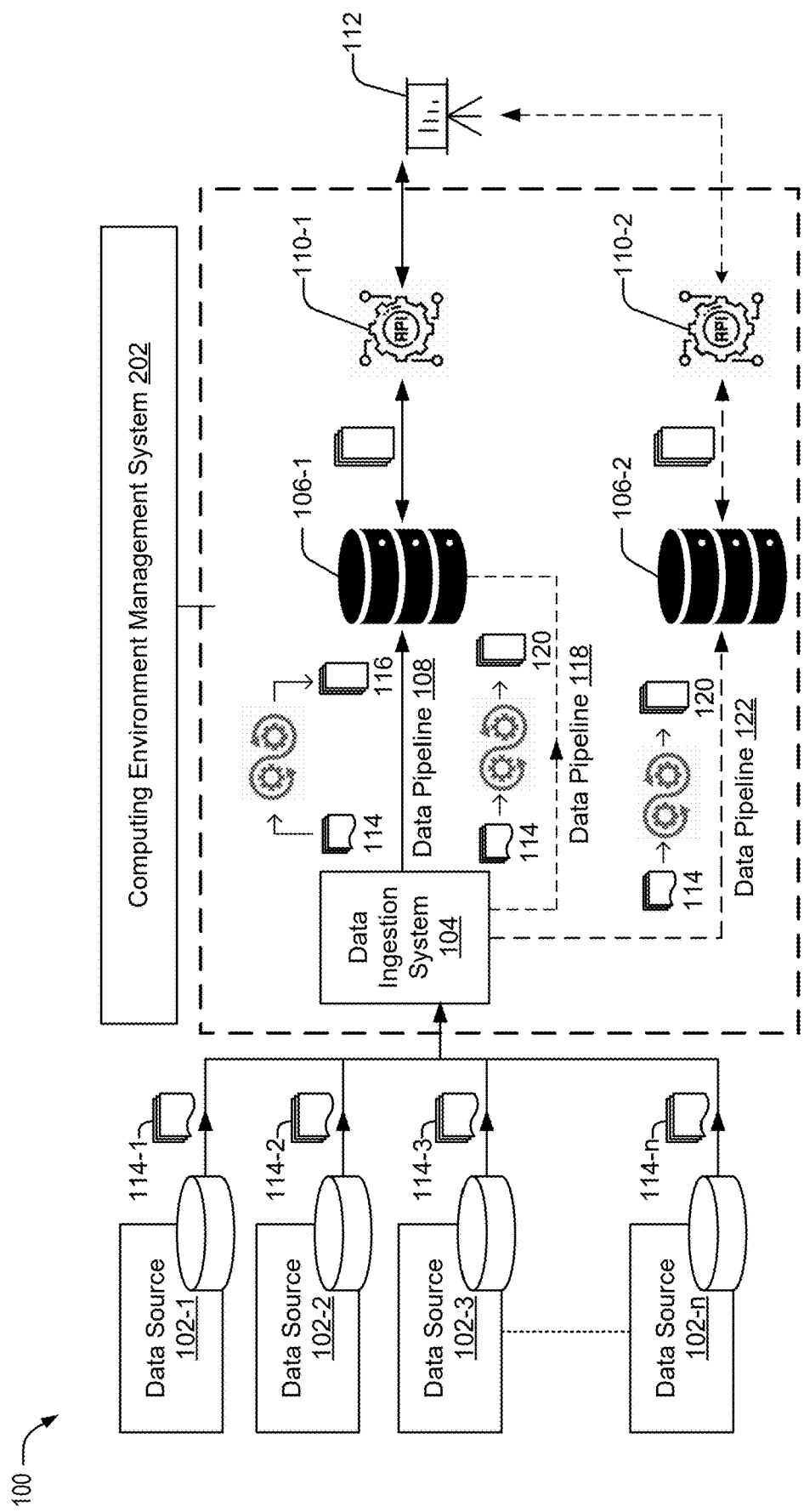
FIG. 3 illustrates the computing environment implementing the data pipeline, in accordance with yet another example of the present subject matter.

FIG. 3 illustrates the computing environment 100 implementing the data pipeline for transforming the data, in accordance with another example of the present subject matter.

The computing environment 100 may include the data sources 102, the data ingestion system 104 coupled to the data sources 102, the first database instance 106-1 coupled to the data ingestion system 104, the first data pipeline 108 coupled to the data ingestion system 104 and the first database instance 106-1, the first API 110-1 coupled to the first database instance 106-1, and the tenant 112 coupled to the first API 110. The computing environment 100 may further include the CEMS 202 communicatively coupled to each of the data ingestion system 104, the first database instance 106-1 coupled to the data ingestion system 104, the first data pipeline 108 coupled to the data ingestion system 104 and the first database instance 106-1, and the first API 110-1 coupled to the first database instance 106-1.

In an example, the CEMS 202 may receive a request for the modification of the transformation standard being utilized by the first data pipeline 108 for transformation of data received from the data ingestion system 104. In the example, the request may be received from the tenant 112. In response to the request, the CEMS 202 may establish a second data pipeline 118 between the data ingestion system 104 and the first database instance 106-1. The second data pipeline 118 may transform the data received from the data ingestion system 104 in accordance with the modified transformation standard. The CEMS 202 may then initialize the second data pipeline 118 to transform the data 114 received from the data ingestion system 104.

In an example, upon initialization of the second data pipeline 118, the CEMS 202 may determine that the transformation of the data 114 at the second data pipeline results in addition of new parameters to the data 114. In such a situation, the CEMS 202 may inspect the schema of the first database instance 106-1 and ascertain that the first database instance 106-1 includes the data fields for storage of the new parameters. Based on the determination, the CEMS 202 may create a second database instance 106-2 including the data fields for storage of the new parameters, within the computing environment 100.

The CEMS 202 may then establish a third data pipeline 122 between the data ingestion system 104 and the second database instance 106-2, where the third data pipeline 122 may transform the data received from the data ingestion system 104 in accordance with the modified transformation standard. In an example, the CEMS 202 may establish the third data pipeline 122 in parallel to the first data pipeline 108 and the second data pipeline 118, i.e., without disconnecting the first data pipeline 108 and the second data pipeline 118. Subsequently, the CEMS 202 may initialize the third data pipeline 122 to transform the data 114 in accordance with the modified transformation standard. In an example, the CEMS 202 may disconnect the second data pipeline 118 upon initialization of the third data pipeline 122.

In an example, before initializing the third data pipeline 122, the CEMS 202 may set up a second API 110-2 to retrieve the data transformed at the third data pipeline, i.e., the transformed data 120, from the second database instance 106-2 and deliver the transformed data 120 to the tenant 112.

Once the third data pipeline 122 has been initialized, the first data pipeline 108 and the third data pipeline 122 may simultaneously transform data 114 to generate the transformed data 116 and the transformed data 120, respectively. The first data pipeline 108 and the third data pipeline 122 may subsequently forward the transformed data 116 and the transformed data 120 to the first database instance 106-1 and the second database instance 106-2, respectively. The first API 110-1 and the second API 110-2 may then retrieve at least one of the transformed data 116 and the transformed data 120 from the first database instance 106-1 and the second database instance 106-2, in accordance with the request from the tenant 112.

Once the third data pipeline 122 has been initialized, the CEMS 202 may disconnect the first data pipeline 108 from the data ingestion system 104 and the first database instance 106-1. Upon disconnection of the first data pipeline 108, the data 114 received from the data ingestion system 104 may be transformed at the third data pipeline, i.e., in accordance with the modified transformation standard, before delivery to the first database instance 106-1. In an example, the CEMS 202 may remove the first database instance 106-1 and the first API 110-1 from the computing environment 100. In the example, before removing the first database instance 106-1, the CEMS 202 may copy the data transformed by the first data pipeline 108 to the second database instance 106-2.

Figure 4:
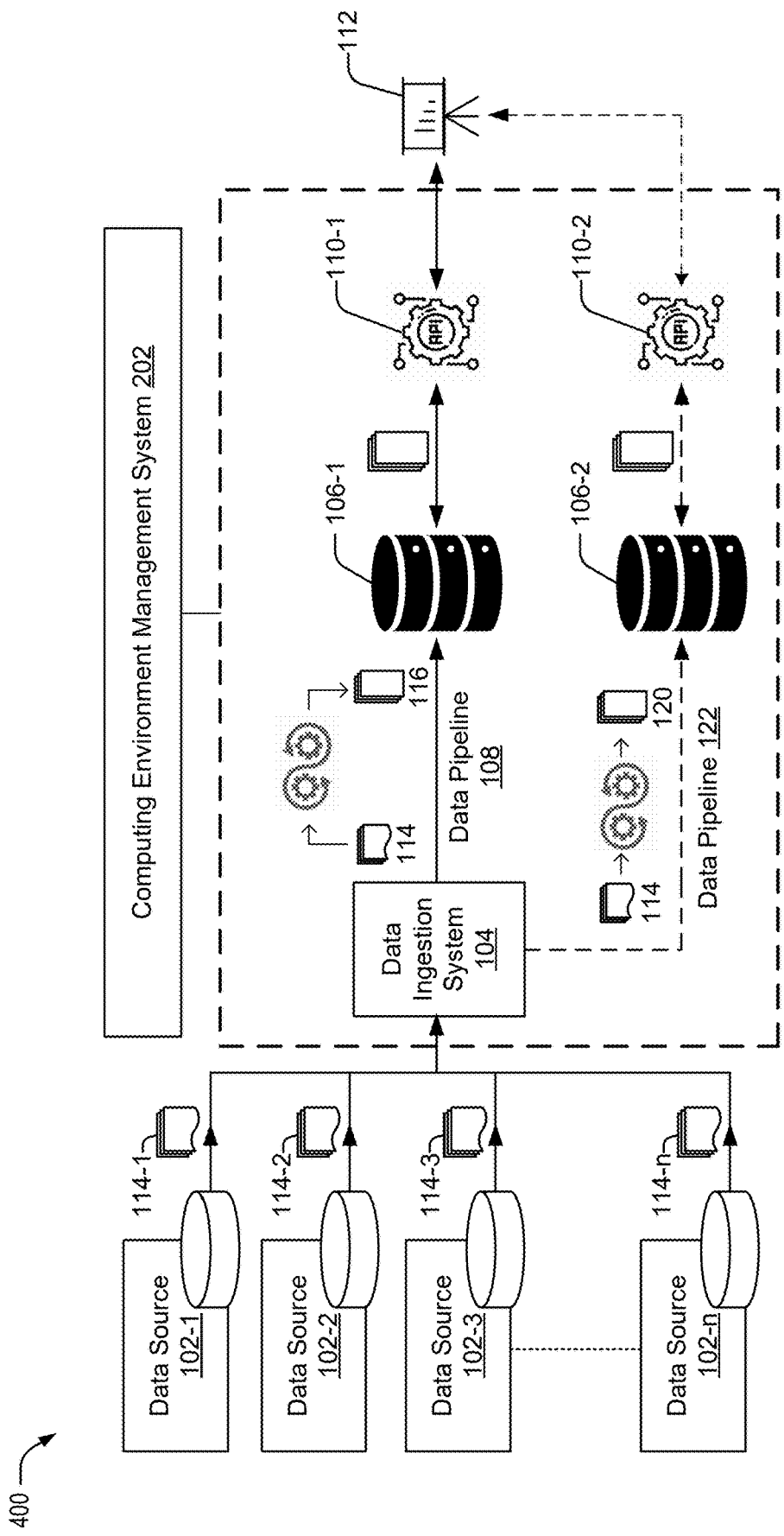
FIG. 4 illustrates the computing environment implementing the data pipeline, in accordance with another example of the present subject matter.

FIG. 4 illustrates the computing environment 100 implementing the data pipeline for transforming the data 114, in accordance with yet another example of the present subject matter.

The computing environment 100 may include the data sources 102, the data ingestion system 104 coupled to the data sources 102, the first database instance 106-1 coupled to the data ingestion system 104, the first data pipeline 108 coupled to the data ingestion system 104 and the first database instance 106-1, the first API 110-1 coupled to the first database instance 106-1, and the tenant 112 coupled to the first API 110-1. The computing environment 100 may further include the CEMS 202 communicatively coupled to each of the data ingestion system 104, the first database instance 106-1 coupled to the data ingestion system 104, the first data pipeline 108 coupled to the data ingestion system 104 and the first database instance 106-1, and the first API 110-1 coupled to the first database instance 106-1.

In an example, the CEMS 202 may receive a request for the modification of the transformation standard being utilized by the first data pipeline 108 for transformation of data received from the data ingestion system 104. In the example, the request may be received from the tenant 112.

In response to the request, the CEMS 202 may ascertain if the transformation of the data 114 in accordance with the modified transformation standard results in addition of new parameters to the data 114. If the CEMS 202 ascertains that the transformation of the data 114 in accordance with the modified transformation standard would result in addition of the new parameters to the data 114, the CEMS 202 may inspect a schema of the first database instance to determine availability of data fields for storage of the new parameters. In an example, the CEMS 202 may determine the data fields for storage of the new parameters to be absent in the schema of the first database instance. In the example, the CEMS 202 may create a second database instance 106-2 including the data fields for storage of the new parameters.

The CEMS 202 may subsequently establish a third data pipeline 122 between the data ingestion system 104 and the second database instance 106-2. The third data pipeline 122 may transform the data received from the data ingestion system 104 in accordance with the modified transformation standard. In an example, the CEMS 202 may set up a second API 110-2 to enable retrieval of the transformed data 120 from the second database instance 106-2. The CEMS 202 may then initialize the third data pipeline 122 to transform the data 114 received from the data ingestion system 104.

Once the third data pipeline 122 has been initialized, the first data pipeline 108 and the third data pipeline 122 may simultaneously transform data 114 to generate the transformed data 116 and the transformed data 120, respectively. The first data pipeline 108 and the third data pipeline 122 may subsequently forward the transformed data 116 and the transformed data 120 to the first database instance 106-1 and the second database instance 106-2, respectively. The first API 110-1 and API 110-2 may then retrieve at least one of the transformed data 116 and the transformed data 120 from the first database instance 106-1 and the second database instance 106-2, respectively.

The first API 110-1 and the second API 110-2 may respectively retrieve the transformed data 116 and the transformed data 120 from the first database instance 106-1 and the second database instance 106-2 at various instances. For instance, in an example, the first API 110-1 and the second API 110-2 may respectively retrieve the transformed data 116 and the transformed data 120 from database instance 106-1 and the second database instance 106-2 upon receiving a request for delivery of the transformed data from the tenant 112. In another example, the first API 110-1 and the second API 110-2 may respectively retrieve the transformed data 116 and the transformed data 120 from the first database instance 106-1 and the second database instance 106-2 in accordance with a schedule for delivery of the transformed data to the tenant 112.

Once the third data pipeline 122 has been initialized, the CEMS 202 may disconnect the first data pipeline 108 from the data ingestion system 104 and the first database instance 106-1. The CEMS 202 may also remove the first database instance 106-1 and the first API 110-1 from the computing environment 100. In an example, before removing the first database instance 106-1, the CEMS 202 may copy the data transformed by the first data pipeline 108 from the first database instance 106-1 to the second database instance 106-2.

FIG. 4 illustrates a schematic of the CEMS 202, in accordance with an example of the present subject matter. Examples of the CEMS 202 may include, but are not limited to, laptops, desktops, personal digital assistants (PDAs), smartphones, tower servers, rack servers, blade servers, and mainframes.

The CEMS 202, among other functions, may facilitate configuration and reconfiguration of various devices, such as the data ingestion system 104, the first database instance 106-1, the second database instance 106-2, the first data pipeline 108, the second data pipeline 118, and the first API 110-1 and the second API 110-2, included in the computing environment 100.

The CEMS 202 may include a processor 502, a memory 504 coupled to the processor 502, and an interface 506 coupled to the memory 504. The functions of various elements shown in the figures, including any functional blocks labelled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA). Other hardware, standard and/or custom, may also be coupled to the processor 502.

The memory 504 may be a computer-readable medium, examples of which include volatile memory (e.g., RAM), and/or non-volatile memory (e.g., Erasable Programmable read-only memory, i.e., EPROM, flash memory, etc.). The memory 504 may be an external memory, or internal memory, such as a flash drive, a compact disk drive, an external hard disk drive, or the like. The memory 504 may further include data which either may be utilized or generated during the operation of the CEMS 202.

The interface 506 may allow the connection or coupling of the CEMS 202 with one or more other devices, through a wired (e.g., Local Area Network, i.e., LAN) connection or through a wireless connection (e.g., Bluetooth®, WiFi). The interface 506 may also enable intercommunication between different logical as well as hardware components of the CEMS 202.

The CEMS 202 may further include data 508 that may be utilized or generated by the processor 502 while performing a variety of functions. In an example, the data 508 includes configuration data 510, reconfiguration request data 512, and other data 514. The configuration data 510 may include data related to configuration of various devices included in the computing environment 100. Further, the reconfiguration request data 512 may include data related to requests for modification of transformation standards being utilized by data pipelines within the computing environment. Further, the other data 514, amongst other things, may serve as a repository for storing data that is processed, or received, or generated as a result of the execution of the instructions by the processor 502.

In operation, the processor 502 may cause the CEMS 202 to receive a request for modification of the transformation standard being utilized by the first data pipeline 108 for transformation of data 114 received from the data ingestion system 104. The transformation standard may be indicative of a first set of policies for transformation of the data being received from the data ingestion system 104 into a format corresponding to a tenant, such as the tenant 112. Further, the request for modification may be indicative of an update in the first set of policies being applied for transformation of the data 114 being received from the data ingestion system 104. In an example, the processor 502 may cause the CEMS 202 to receive the request for modification of the transformation standard from the tenant 112. In the example, the processor 502 may then cause the CEMS 202 to store the request for modification and details related to such request in the reconfiguration request data 512.

In an example of the present subject matter, in response to the request for modification of the transformation standard, the processor 502 may cause the CEMS 202 to establish the second data pipeline 118 between the data ingestion system 104 and the first database instance 106-1, where the second data pipeline 118 may transform the data received from the data ingestion system 104 in accordance with a modified transformation standard. In an example, the processor 502 may cause the CEMS 202 to establish the second data pipeline 118 in parallel to the first data pipeline 108, i.e., without disconnecting the first data pipeline. Subsequently, the processor 502 may initialize the second data pipeline 118 to transform the data 114 in accordance with the modified transformation standard.

In an example, before initializing the second data pipeline 118, the processor 502 may cause the CEMS 202 to modify the first API 110-1 to retrieve the data transformed at the second data pipeline, i.e., the transformed data 120, from the first database instance 106-1. In an example, the processor 502 may cause the CEMS 202 to modify the first API 110-1 to retrieve the transformed data 120, along with the data transformed at the first data pipeline 108, i.e., the transformed data 116, from the first database instance 106-1. In another example, the processor 502 may cause the CEMS 202 to modify the first API 110-1 to retrieve the transformed data 120 from the first database instance 106-1 and skip the retrieval of the transformed data 116.

Upon initialization of the second data pipeline 118, the first data pipeline 108 and the second data pipeline 118 may simultaneously transform data 114 to generate the transformed data 116 and the transformed data 120, respectively. The first data pipeline 108 and the second data pipeline 118 may subsequently forward the transformed data 116 and the transformed data 120 to the database instance 106. The first API 110-1 may then retrieve at least one of the transformed data 116 and the transformed data 120 from the first database instance 106-1.

In an example, once the second data pipeline 118 has been initialized, the CEMS 202 may disconnect the first data pipeline 108 from the data ingestion system 104 and the first database instance 106-1. Upon disconnection of the first data pipeline 108, the data 114 received from the data ingestion system 104 may be transformed at the second data pipeline, i.e., in accordance with the modified transformation standard, before delivery to the first database instance 106-1. In an example, the processor 502 may then cause the CEMS 202 to store the revised configuration of the computing environment 100 in the configuration data 510.

In an example, upon initialization of the second data pipeline 118 and before disconnection of the first data pipeline 108, the processor 502 may determine that the transformation of the data 114 at the second data pipeline results in addition of new parameters to the data 114. In such a situation, if it is determined that the transformation of the data 114 in accordance with the modified transformation standard results in addition of new parameters to the data 114, the processor 502 may cause the CEMS 202 to inspect the schema of the first database instance 106-1 and ascertain if the first database instance 106-1 includes the data fields for storage of the new parameters. If it is determined that the first database instance 106-1 does not include the data fields for the storage of the new parameters, the processor 502 causes the CEMS 202 to create a second database instance 106-2 including the data fields for storage of the new parameters, within the computing environment 100.

The processor 502 may then cause the CEMS 202 to establish a third data pipeline 122 between the data ingestion system 104 and the second database instance 106-2, where the third data pipeline 122 may transform the data received from the data ingestion system 104 in accordance with the modified transformation standard. In an example, the processor 502 may cause the CEMS 202 to establish the third data pipeline 122 in parallel to the first data pipeline 108 and the second data pipeline 118, i.e., without disconnecting the first data pipeline 108 and the second data pipeline 118. Subsequently, the processor 502 may initialize the third data pipeline 122 to transform the data 114 in accordance with the modified transformation standard. In an example, the processor 502 may cause the CEMS 202 to disconnect the second data pipeline 118 upon initialization of the third data pipeline 122.

In an example, before initializing the third data pipeline 122, the processor 502 may cause the CEMS 202 to set up a second API 110-2 to retrieve the data transformed at the third data pipeline, i.e., the transformed data 120, from the second database instance 106-2 and deliver the transformed data 120 to the tenant 112.

Once the third data pipeline 122 has been initialized, the first data pipeline 108 and the third data pipeline 122 may simultaneously transform data 114 to generate the transformed data 116 and the transformed data 120, respectively. The first data pipeline 108 and the third data pipeline 122 may subsequently forward the transformed data 116 and the transformed data 120 to the first database instance 106-1 and the second database instance 106-2, respectively. The first API 110-1 and the second API 110-2 may then retrieve at least one of the transformed data 116 and the transformed data 120 from the first database instance 106-1 and the second database instance 106-2, in accordance with the request from the tenant 112.

Once the third data pipeline 122 has been initialized, the CEMS 202 may disconnect the first data pipeline 108 from the data ingestion system 104 and the first database instance 106-1. Upon disconnection of the first data pipeline 108, the data 114 received from the data ingestion system 104 may be transformed at the third data pipeline, i.e., in accordance with the modified transformation standard, before delivery to the first database instance 106-1. In an example, the processor 502 may cause the CEMS 202 to remove the first database instance 106-1 and the first API 110-1 from the computing environment 100. In the example, before removing the first database instance 106-1, the processor 502 may cause the CEMS 202 to copy the data transformed by the first data pipeline 108 to the second database instance 106-2. In an example, the processor 502 may then cause the CEMS 202 to store the revised configuration of the computing environment 100 in the configuration data 510.

Establishing another data pipeline, i.e., either the second data pipeline 118 or the third data pipeline 122, with the modified transformation standard in parallel to the first data pipeline 108 and initiating transformation of the data at the other data pipeline before disconnecting the first data pipeline 108 ensures that the transformation standard being utilized for processing of the data is reconfigured in real-time without any downtime in data transformation being performed in the computing environment.

In another example of the present subject matter, in response to the request for modification of the transformation standard, the processor 502 may cause the CEMS 202 to ascertain if the modification of the transformation standard results in addition of new parameters to the data 114. If it is determined that the transformation of the data 114 in accordance with the modified transformation standard results in addition of new parameters to the data 114, the processor 502 may cause the CEMS 202 to inspect the schema of the first database instance 106-1 and ascertain if the first database instance 106-1 includes the data fields for storage of the new parameters. If it is determined that the first database instance 106-1 does not include the data fields for the storage of the new parameters, the processor 502 causes the CEMS 202 to create a second database instance 106-2 including the data fields for storage of the new parameters, within the computing environment 100.

The processor 502 may then cause the CEMS 202 to establish the third data pipeline 122 between the data ingestion system 104 and the second database instance 106-2, where the third data pipeline 122 may transform the data received from the data ingestion system 104 in accordance with a modified transformation standard. In an example, the processor 502 may cause the CEMS 202 to establish the third data pipeline 122 in parallel to the first data pipeline 108, i.e., without disconnecting the first data pipeline. Subsequently, the processor 502 may initialize the third data pipeline 122 to transform the data 114 in accordance with the modified transformation standard.

In an example, before initializing the third data pipeline 122, the processor 502 may cause the CEMS 202 to set up a second API 110-2 to retrieve the data transformed at the third data pipeline 122, i.e., the transformed data 120, from the second database instance 106-2 and deliver the transformed data 120 to the tenant 112.

Once the third data pipeline 122 has been initialized, the first data pipeline 108 and the third data pipeline 122 may simultaneously transform data 114 to generate the transformed data 116 and the transformed data 120, respectively. The first data pipeline 108 and the third data pipeline 122 may subsequently forward the transformed data 116 and the transformed data 120 to the first database instances 106-1 and the second database instance 106-2, respectively. The first API 110-1 and the second API 110-2 may then retrieve at least one of the transformed data 116 and the transformed data 120 from the database instance 106, in accordance with the request from the tenant 112.

In an example, once the third data pipeline 122 has been initialized, the CEMS 202 may disconnect the first data pipeline 108 from the data ingestion system 104 and the first database instance 106-1. Upon disconnection of the first data pipeline 108, the data 114 received from the data ingestion system 104 may be transformed at the third data pipeline, i.e., in accordance with the modified transformation standard, before delivery to the first database instance 106-1. In an example, the processor 502 may then cause the CEMS 202 to store the revised configuration of the computing environment 100 in the configuration data 510.

Establishing the third data pipeline 122 with the modified transformation standard in parallel to the first data pipeline 108 and initiating transformation of the data at the third data pipeline 122 before disconnecting the first data pipeline 108 ensures that the transformation standard being utilized for processing of the data is reconfigured in real-time without any downtime in data transformation being performed in the computing environment.

FIGS. 6, FIG. 7, and FIGS. 8A and 8B illustrate methods 600, 700, and 800 for reconfiguring a data pipeline in a computing environment, in accordance with examples of the present subject matter. The order in which the methods are described is not intended to be construed as a limitation, and any number of the described method blocks may be combined in any order to implement the methods, or an alternative method. Further, the methods 600, 700, and 800 may be implemented by processing resource or computing device(s) through any suitable hardware, non-transitory machine-readable instructions, or combination thereof.

Figure 5:
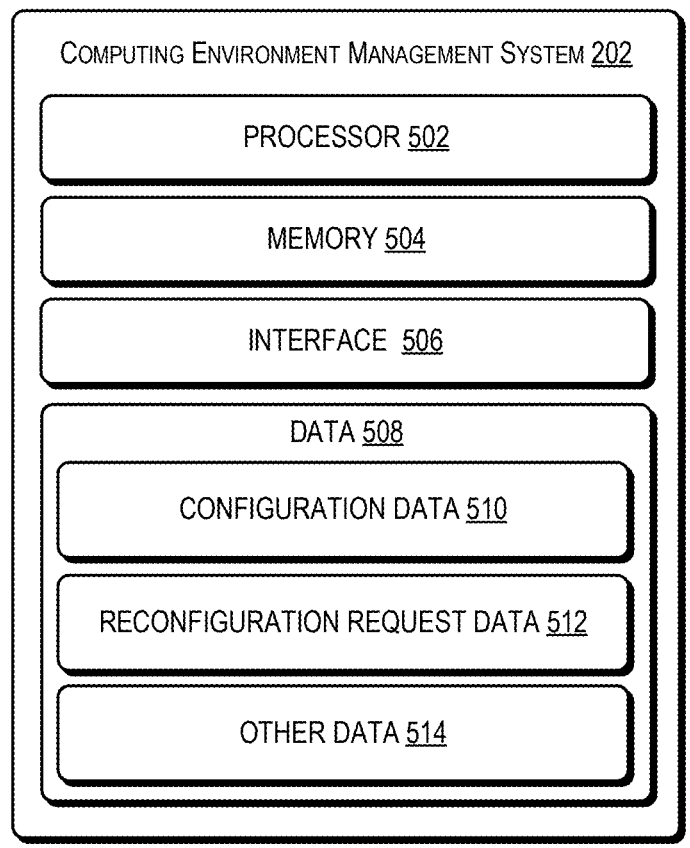
FIG. 5 illustrates schematics of a Computing Environment Management System (CEMS) for reconfiguration of the data pipeline in the computing environment, in accordance with another example of the present subject matter.

It may also be understood that methods 600, 700, and 800 may be performed by a programmed computing device, such as the CEMS 202, as depicted in FIG. 5. Furthermore, the methods 600, 700, and 800 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 600, 700, and 800 is described below with reference to the CEMS 202, as described above, other suitable systems for the execution of these methods may also be utilized. Additionally, implementation of the method is not limited to such examples.

Figure 6:
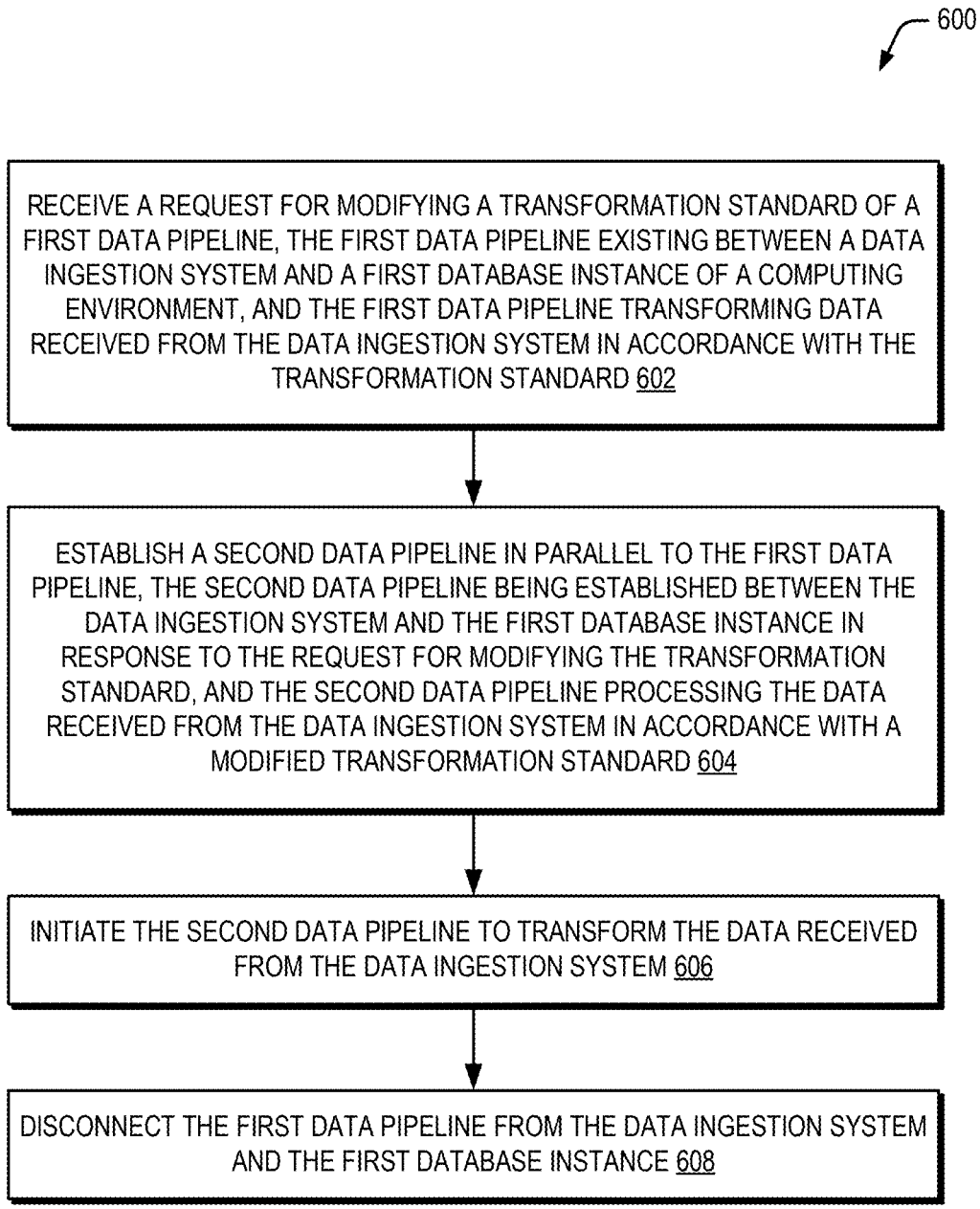
FIG. 6 illustrates a method for reconfiguration of the data pipeline in the computing environment, in accordance with an example of the present subject matter.

In FIG. 6, at block 602, a request for modifying a transformation standard of a first data pipeline is received, where the first data pipeline exists between a data ingestion system and a first database instance of a computing environment. In an example, the first data pipeline transforms the data received from the data ingestion system in accordance with the transformation standard.

At block 604, a second data pipeline is established in parallel to the first data pipeline, where the second data pipeline is established between the data ingestion system and the first database instance in response to the request for modifying the transformation standard. In an example, the second data pipeline processes the data received from the data ingestion system in accordance with a modified transformation standard.

At block 606, the second data pipeline is initiated to transform the data received from the data ingestion system. In an example, once the second data pipeline has been initialized, the data transformed by each of the first data pipeline and the second data pipeline may be transmitted to the first database instance for storage. In the example, a first Application Programming Interface (API) in communication with the first database instance may then be modified to retrieve the data transformed by at least one of the first data pipeline and the second data pipeline upon receiving a request for providing the transformed data.

At block 608, the first data pipeline is disconnected from the data ingestion system and the first database instance.

Figure 7:
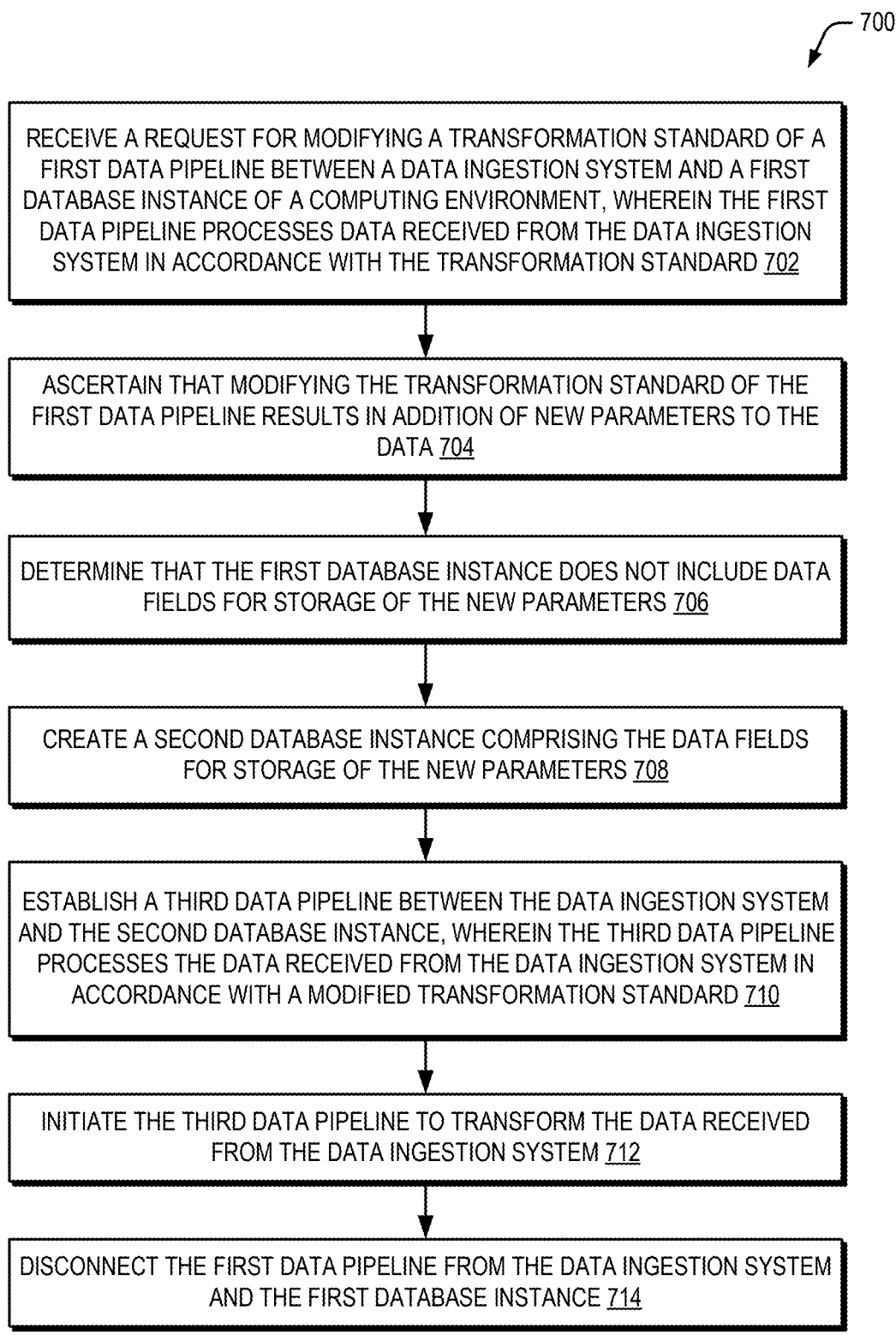
FIG. 7 illustrates the method for reconfiguration of the data pipeline in the computing environment, in accordance with another example of the present subject matter.

In FIG. 7, at block 702, a request for modifying a transformation standard of a first data pipeline between a data ingestion system and a first database instance of a computing environment is received. In an example, the first data pipeline processes data received from the data ingestion system in accordance with the transformation standard.

At block 704, it is ascertained that modifying the transformation standard of the first data pipeline would result in addition of new parameters to the data. At block 706, it is determined that the first database instance does not include data fields for storage of the new parameters.

At block 708, a second database instance comprising the data fields for storage of the new parameters is created. In the example, upon creation of the second database instance, the data transformed by the first data pipeline may be copied from the first database instance to the second database instance.

At block 710, a third data pipeline between the data ingestion system and the second database instance is established, where the third data pipeline processes the data received from the data ingestion system in accordance with a modified transformation standard.

At block 712, the third data pipeline is initialized to transform the data received from the data ingestion system. In an example, a second API may be set up in communication with the second database instance to retrieve the data transformed by the third data pipeline upon reception of a request for providing the transformed data.

At block 714, the first data pipeline is disconnected from the data ingestion system and the first database instance. In an example, subsequent to disconnection of the first data pipeline from the data ingestion system and first database instance, the first database instance may also be removed from the computing environment.

Figure 8A:
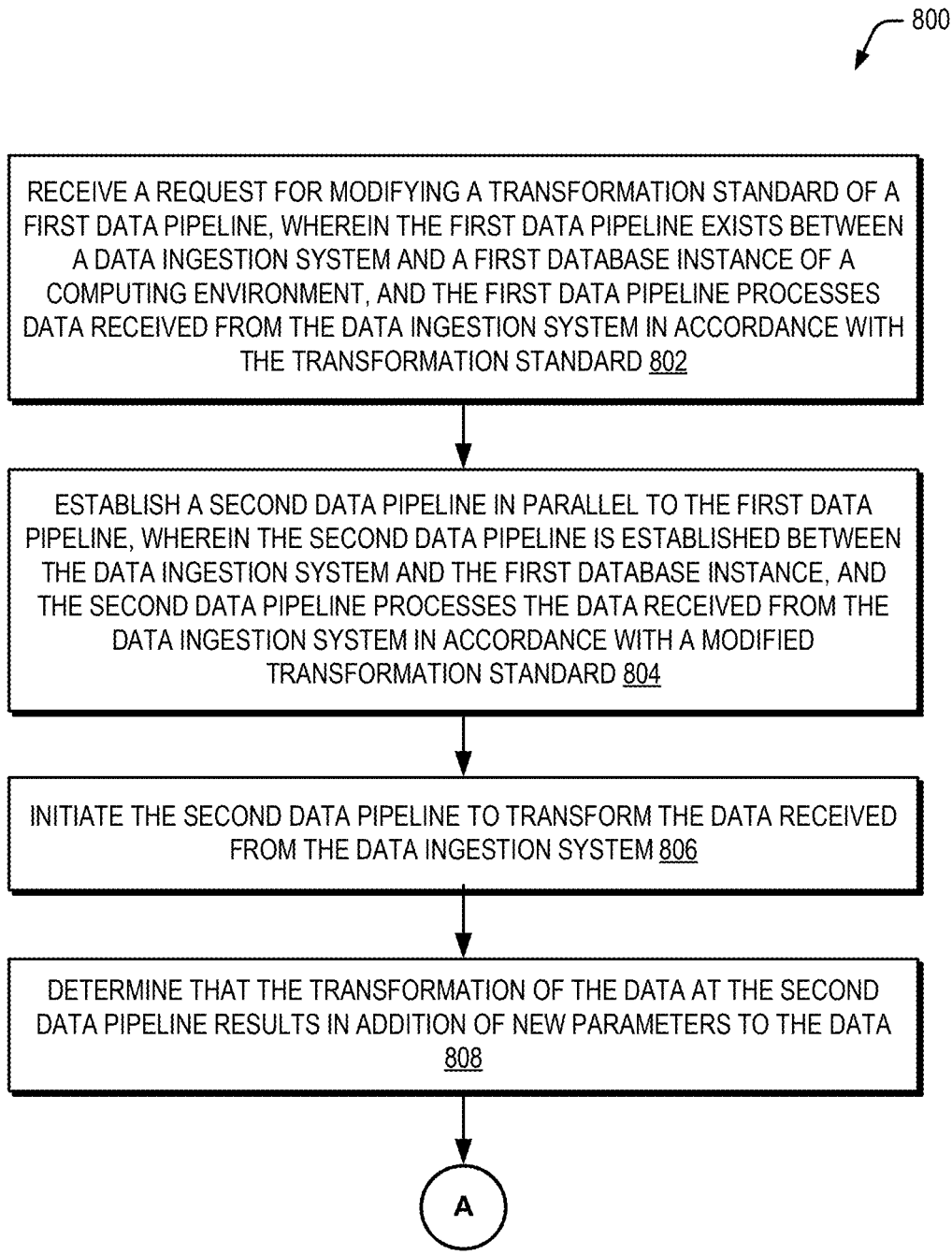
FIGS. 8A and 8B illustrate the methods for reconfiguration of the data pipeline in the computing environment, in accordance with another example of the present subject matter.
Figure 8B:
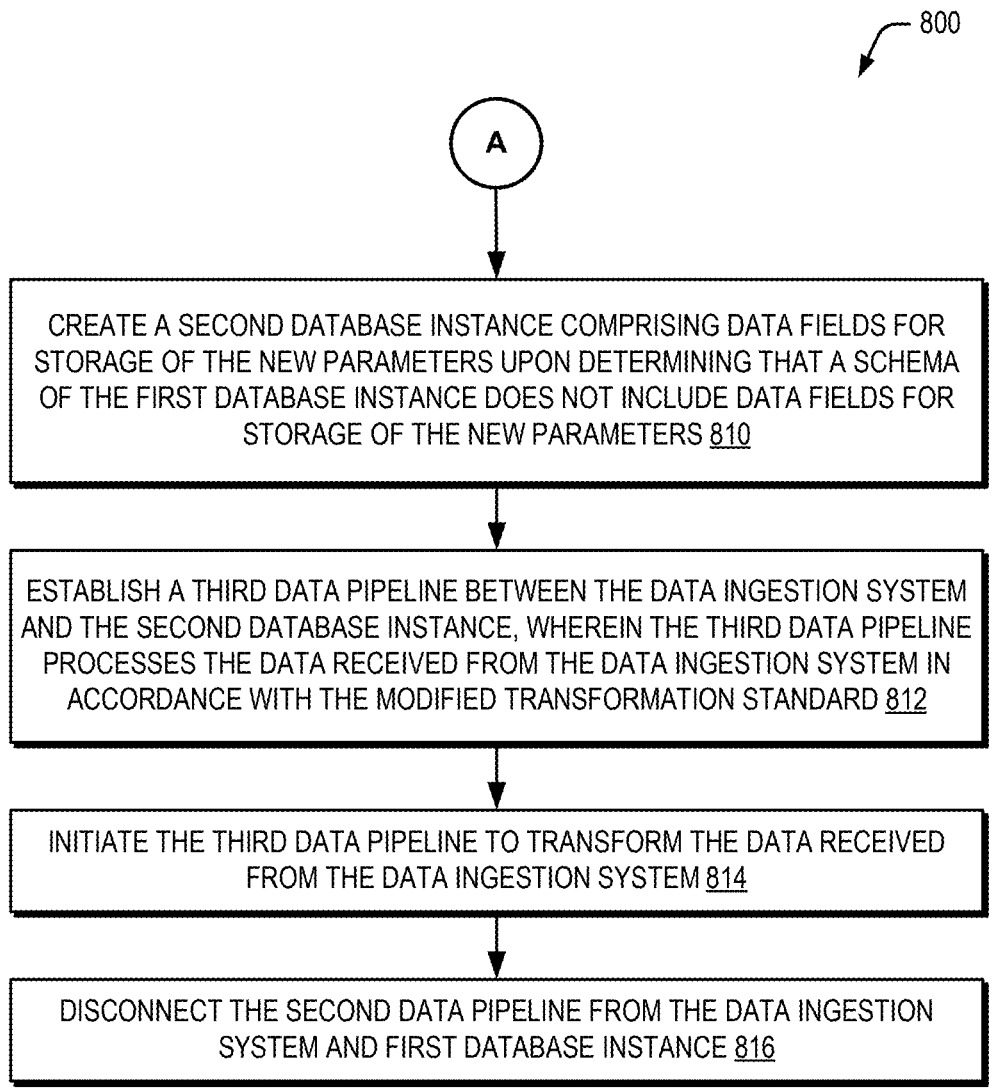

In FIGS. 8A and 8B, at block 802, a request for modifying a transformation standard of a first data pipeline is received, where the first data pipeline exists between a data ingestion system and a first database instance of a computing environment. In an example, the first data pipeline processes data received from the data ingestion system in accordance with the transformation standard.

At block 804, a second data pipeline is established in parallel to the first data pipeline, where the second data pipeline is established between the data ingestion system and the first database instance. In an example, the second data pipeline may process the data received from the data ingestion system in accordance with a modified transformation standard.

At block 806, the second data pipeline is initiated to transform the data received from the data ingestion system. In an example, upon initialization of the second data pipeline, the data transformed by each of the first data pipeline and the second data pipeline may be transmitted for storage in the first database instance. In the example, a first API in communication with the first database instance may then be modified to retrieve the data transformed by each of the first data pipeline and the second data pipeline upon reception of a request for providing the transformed data.

At block 808, it is determined that the transformation of the data at the second data pipeline results in addition of new parameters to the data. At block 810, a second database instance including data fields for storage of the new parameters is created. In an example, the second database is created upon determining that a schema of the first database instance does not include data fields for storage of the new parameters. In the example, upon creation of the second database instance, the data transformed by the first data pipeline may be copied from the first database instance to the second database instance.

At block 812, a third data pipeline is established between the data ingestion system and the second database instance, where the third data pipeline processes the data received from the data ingestion system in accordance with the modified transformation standard.

At block 814, the third data pipeline is initialized to transform the data received from the data ingestion system. In an example, upon initialization of the third data pipeline, the data transformed by each of the first data pipeline and the second data pipeline may be transmitted to the first database instance. In the example, a second API may then be set up in communication with the second database instance to retrieve the data transformed by the third data pipeline upon reception of a request for providing the transformed data.

Subsequently, at block 816, the second data pipeline is disconnected from the data ingestion system and first database instance. In an example, subsequent to disconnection of the second data pipeline from the data ingestion system and first database instance, the first database instance may also be removed from the computing environment.

Figure 9:
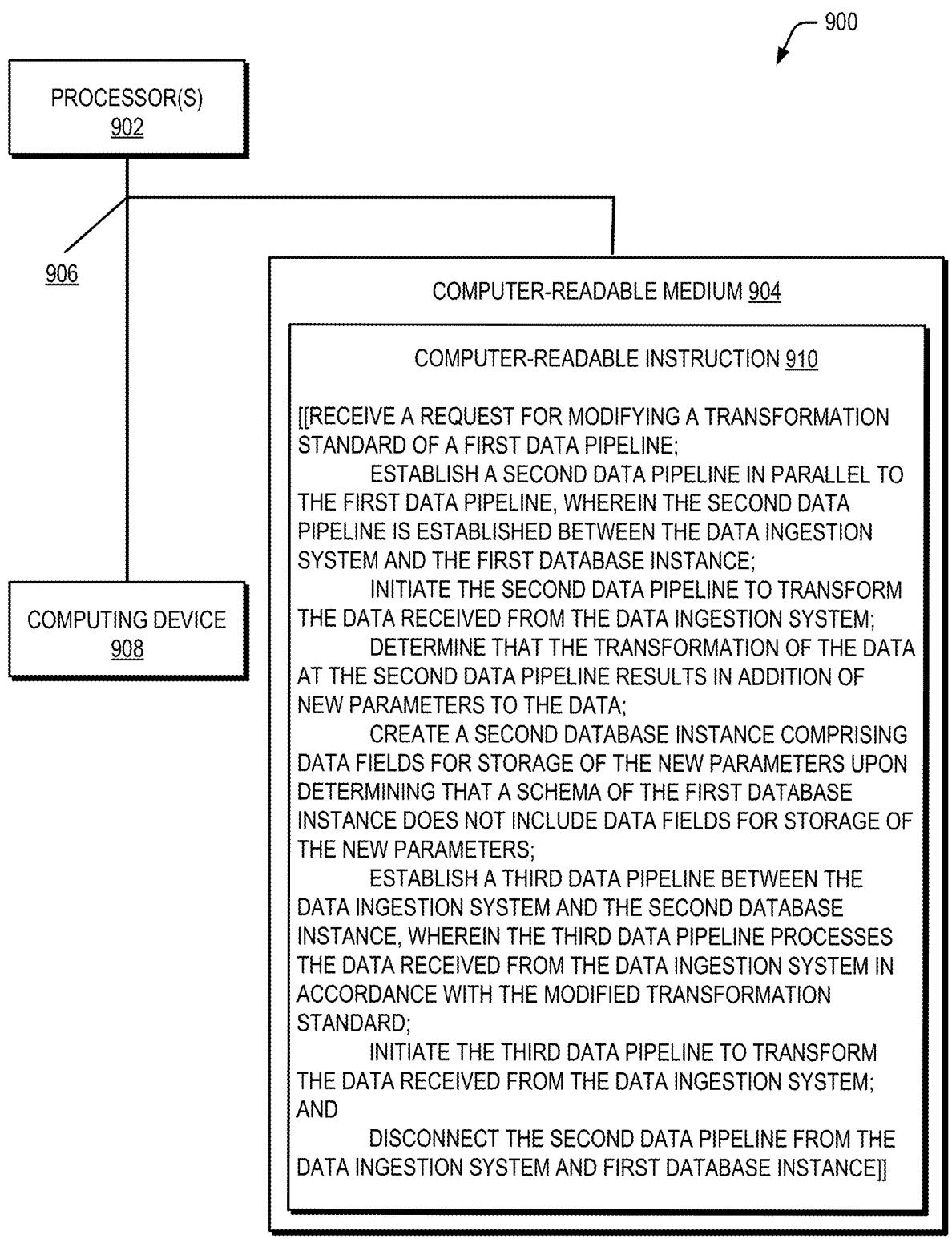
FIG. 9 illustrates a non-transitory computer-readable medium for reconfiguration of the data pipeline in the computing environment, in accordance with another example of the present subject matter.

FIG. 9 illustrates a non-transitory computer-readable medium for reconfiguring a data pipeline in a computing environment, in accordance with an example of the present subject matter.

In an example, the computing environment 900 includes processor 902 communicatively coupled to a non-transitory computer readable medium 904 through communication link 906. In an example, the processor 902 may have one or more processing resources for fetching and executing computer-readable instructions from the non-transitory computer readable medium 904. The processor 902 and the non-transitory computer readable medium 904 may be implemented, for example, in the CEMS 202.

The non-transitory computer readable medium 904 may be, for example, an internal memory device or an external memory. In an example implementation, the communication link 906 may be a network communication link, or other communication links, such as a PCI (Peripheral component interconnect) Express, USB-C (Universal Serial Bus Type-C) interfaces, I2C (Inter-Integrated Circuit) interfaces, etc. In an example implementation, the non-transitory computer readable medium 904 includes a set of computer readable instructions 910 which may be accessed by the processor 902 through the communication link 906 and subsequently executed for reconfiguring the data pipeline. The processor(s) 902 and the non-transitory computer readable medium 904 may also be communicatively coupled to a computing device 908 over the network.

Referring to FIG. 9, in an example, the non-transitory computer readable medium 904 includes computer readable instructions 910 that cause the processor 902 to receive a request for modifying a transformation standard of a first data pipeline, where the first data pipeline exists between a data ingestion system and a first database instance of a computing environment. In an example, the first data pipeline processes data received from the data ingestion system in accordance with the transformation standard.

The instructions 910 may further cause the processor 902 to establish a second data, where the second data pipeline is established between the data ingestion pipeline in parallel to the first data pipeline system and the first database instance. Further, the second data pipeline processes the data received from the data ingestion system in accordance with a modified transformation standard.

Further, the instructions 910 may cause the processor 902 to initiate the second data pipeline to transform the data received from the data ingestion system. In an example, upon initialization of the second data pipeline, the instructions 910 may cause the processor 902 to transmit the data transformed by each of the first data pipeline and the second data pipeline to the first database instance. Further, in the example, the instructions 910 may cause the processor 902 to modify a first API in communication with the first database instance to retrieve the data transformed by each of the first data pipeline and the second data pipeline upon reception of a request for providing the transformed data.

The instructions 910 may further cause the processor 902 to determine that the transformation of the data at the second data pipeline results in addition of new parameters to the data. Further, the instructions 910 may cause the processor 902 to create a second database instance comprising data fields for storage of the new parameters. In an example, the instructions 910 may cause the processor 902 to create the second database instance upon determining that a schema of the first database instance does not include data fields for storage of the new parameters. In the example, upon creation of the second database instance, the instructions 910 may cause the processor 902 to copy data transformed by the first data pipeline from the first database instance to the second database instance.

The instructions 910 may further cause the processor 902 to establish a third data pipeline between the data ingestion system and the second database instance, where the third data pipeline processes the data received from the data ingestion system in accordance with the modified transformation standard.

Further, the instructions 910 may cause the processor 902 to initiate the third data pipeline to transform the data received from the data ingestion system. In an example, upon initialization of the third data pipeline, the data transformed by each of the first data pipeline and the second data pipeline may be transmitted to the first database instance. In the example, the instructions 910 may further cause the processor 902 to set up a second API in communication with the second database instance to retrieve the data transformed by the third data pipeline upon reception of a request for providing the transformed data.

The instructions 910 may further cause the processor 902 to disconnect the second data pipeline from the data ingestion system and first database instance. In an example, subsequent to disconnection of the second data pipeline from the data ingestion system and first database instance, instructions 910 may cause the processor 902 to remove the first database instance from the computing environment.

Although examples of the present subject matter have been described in language specific to methods and/or structural features, it is to be understood that the present subject matter is not limited to the specific methods or features described. Rather, the methods and specific features are disclosed and explained as examples of the present subject matter.

We claim:

1. A method implemented at a Computing Environment Management System (CEMS), the method comprising:
   receiving, by the CEMS, a request for modifying a transformation standard of a first data pipeline, the first data pipeline existing between a data ingestion system and a first database instance of a computing environment, and the first data pipeline transforming data received from the data ingestion system in accordance with the transformation standard, wherein the transformation standard is tenant-specific;
   establishing, by the CEMS, a second data pipeline in parallel to the first data pipeline, the second data pipeline being established between the data ingestion system and the first database instance in response to the request for modifying the transformation standard, and the second data pipeline processing the data received from the data ingestion system in accordance with a modified transformation standard;
   initiating, by the CEMS, the second data pipeline to transform the data received from the data ingestion system, wherein said initiating the second data pipeline comprises transmitting the data transformed by each of the first data pipeline and the second data pipeline for storage in the first database instance;
   modifying, by the CEMS, a first Application Programming Interface (API) to retrieve data transformed by both the first data pipeline and the second data pipeline upon receiving a request for providing the transformed data; and
   disconnecting, by the CEMS, the first data pipeline from the data ingestion system and the first database instance.

2. The method as claimed in claim 1, further comprising modifying the first API to retrieve the data transformed by the second data pipeline upon receiving a request for providing the transformed data.

3. The method as claimed in claim 1, further comprising:
   ascertaining that the transformation of the data at the second data pipeline results in an addition of new parameters to the data;
   inspecting a schema of the first database instance to determine availability of data fields for storage of the new parameters;
   creating a second database instance comprising the data fields for storage of the new parameters upon determining the data fields for storage of the new parameters to be absent in the schema of the first database instance; and
   copying the data transformed by the first data pipeline to the second database instance.

4. The method as claimed in claim 3, further comprising:
   establishing a third data pipeline between the data ingestion system and the second database instance, wherein the third data pipeline processes the data received from the data ingestion system in accordance with the modified transformation standard;
   initiating the third data pipeline to transform the data received from the data ingestion system in accordance with the modified transformation standard; and
   disconnecting the second data pipeline from the data ingestion system and the first database instance.

5. The method as claimed in claim 4, further comprising setting up a second API in communication with the second database instance to retrieve the data transformed by the third data pipeline upon reception of a request for providing the transformed data.

6. The method as claimed in claim 4, further comprising removing the first database instance from the computing environment.

7. A Computing Environment Management System (CEMS) comprising:
   at least one processor;
   at least one memory storing instructions that, when executed by the at least one processor, cause the CEMS to:
   receive a request for modifying a transformation standard of a first data pipeline, wherein the first data pipeline exists between a data ingestion system and a first database instance of a computing environment, and the first data pipeline processes data received from the data ingestion system in accordance with the transformation standard, wherein the transformation standard is tenant-specific;
   ascertain that modifying the transformation standard of the first data pipeline results in addition of new parameters to the data;
   determine that the first database instance does not include data fields for storage of the new parameters;
   create a second database instance comprising the data fields for storage of the new parameters;
   establish a third data pipeline between the data ingestion system and the second database instance, wherein the third data pipeline processes the data received from the data ingestion system in accordance with a modified transformation standard;
   initiate the third data pipeline to transform the data received from the data ingestion system; and initiating, by the CEMS, a second data pipeline to transform the data received from the data ingestion system, wherein said initiating the second data pipeline comprises transmitting the data transformed by each of the first data pipeline and the second data pipeline for storage in the first database instance;

modifying, by the CEMS, a first Application Programming Interface (API) to retrieve data transformed by both the first data pipeline and the second data pipeline upon receiving a request for providing the transformed data; and disconnect the first data pipeline from the data ingestion system and the first database instance.

8. The CEMS as claimed in claim 7, wherein the at least one processor causes the CEMS to set up a first API in communication with the second database instance to retrieve the data transformed by the third data pipeline upon reception of a request for providing the transformed data.

9. The CEMS as claimed in claim 7, wherein the at least one processor causes the CEMS to copy the data transformed by the first data pipeline to the second database instance.

10. The CEMS as claimed in claim 9, wherein the at least one processor causes the CEMS to remove the first database instance from the computing environment.

11. A non-transitory computer readable medium comprising computer-readable instructions that when executed cause a processing resource of a computing device to:

receive a request for modifying a transformation standard of a first data pipeline, wherein the first data pipeline exists between a data ingestion system and a first database instance of a computing environment, and the first data pipeline processes data received from the data ingestion system in accordance with the transformation standard, wherein the transformation standard is tenant-specific;

establish a second data pipeline in parallel to the first data pipeline, wherein the second data pipeline is established between the data ingestion system and the first database instance, and the second data pipeline processes the data received from the data ingestion system in accordance with a modified transformation standard;

initiate the second data pipeline to transform the data received from the data ingestion system, wherein the initiation of the second data pipeline comprises transmitting the data transformed by each of the first data pipeline and the second data pipeline for storage in the first database instance;

modify a first API in communication with the first database instance to retrieve the data transformed by each of the first data pipeline and the second data pipeline upon reception of a request for providing the transformed data;

determine that the transformation of the data at the second data pipeline results in addition of new parameters to the data;

create a second database instance comprising data fields for storage of the new parameters upon determining that a schema of the first database instance does not include data fields for storage of the new parameters;

establish a third data pipeline between the data ingestion system and the second database instance, wherein the third data pipeline processes the data received from the data ingestion system in accordance with the modified transformation standard;

initiate the third data pipeline to transform the data received from the data ingestion system; and disconnect the second data pipeline from the data ingestion system and first database instance.

12. The non-transitory computer-readable medium as claimed in claim 11, wherein the instructions cause the processing resource to modify the first API to retrieve the data transformed by the second data pipeline upon reception of a request for providing the transformed data.

13. The non-transitory computer-readable medium as claimed in claim 11, wherein the instructions cause the processing resource to set up a second API in communication with the second database instance to retrieve the data transformed by the third data pipeline upon reception of a request for providing the transformed data.

14. The non-transitory computer-readable medium as claimed in claim 11, wherein the instructions cause the processing resource to copy the data transformed by the first data pipeline to the second database instance.

15. The non-transitory computer-readable medium as claimed in claim 11, wherein the instructions cause the processing resource to disconnect the first data pipeline from the data ingestion system and the first database instance.

16. The non-transitory computer-readable medium as claimed in claim 11, wherein the instructions cause the processing resource to remove the first database instance from the computing environment.

* * * * *